2,885,259

PROCESS FOR RECOVERY OF CONSTITUENTS OF ORES

Robert F. McCullough, Glenview, Ill., assignor, by mesne assignments, to the United States of America as represented by the United States Atomic Energy Commission No Drawing. Application June 21, 1955
Serial No. 517,060

11 Claims. (Cl. 23—14.5)

This invention relates to the recovery of constituents of low grade phosphate-bearing ores. More particularly, it relates to the rendering of the $P_2O_5$ constituents of phosphate and aluminum clays such as leached zone material from the Florida pebble phosphate fields, available as fertilizer. Still more particularly, it relates to the recovery of phosphorus, aluminum, uranium and minor values from the leached zone material. Examination of the leached zone material indicates the presence of major mineral phases such as quartz, wavellite and pseudo wavellite with some phases of feldspar, fluorapatite, kaolinite and the like. The present invention is directed to the treatment of ores of which this leached zone material is representative or ore fractions in which the clay-like portions predominate.

The following analyses of leached zone material were obtained by averaging the analyses obtained from about 200 drill core samples procured over an area of about 36 square miles in Polk County, Florida. Analyses were as follows:

|  | Percent |
|---|---|
| $P_2O_5$ | 8.69 |
| $Al_2O_3$ | 8.68 |
| CaO | 6.37 |
| $U_3O_8$ | 0.014 |
| Acid insolubles | 68.72 |

Since the vast percentage of the acid insoluble material is quartz and since it has a coarser particle size than the other materials contained in the leached zone being mined, it has been found advantageous but not necessary to the invention to split the ore, after suitable comminution if desired, into one fraction of small particles and another fraction of coarser particles. It is not meant by this discussion to infer that the entire leached zone material would not be amenable to processing in accordance with the present invention. However, the solids are usually split at from about 150 mesh up to about 220 mesh after having been slurried with water. Other mesh splits may also be used commensurate with efficient operation of the comminution and classifying equipment. The fraction containing the particles smaller than this range has been found to be the more valuable fraction, while the fraction containing the particles larger than this range is the fraction which is predominantly quartz and, therefore, a normally discarded material.

The process of the present invention preferably is concerned with the solubilizing and recovery of mineral values contained in the fraction whose particles are smaller than about −150 mesh. The following table shows a typical split in mineral values between the +200 mesh fraction and the −200 mesh fraction:

| Mineral Value | Plus 200 Mesh, percent | Minus 200 Mesh, percent |
|---|---|---|
| $P_2O_5$ | 5.44 | 14.68 |
| $Al_2O_3$ | 1.68 | 25.34 |
| CaO | 5.53 | 9.19 |
| $Fe_2O_3$ | 1.60 | 3.11 |
| $U_3O_8$ | 0.0053 | 0.0299 |
| Acid Insolubles | 83.08 | 38.56 |

Leached zone material may be processed either on a so-called "as mined" basis or a "wet" basis. If the leached zone material is to be handled in wet form, the material is slurried to about 25% solids with water in a pit at the mining point, pumped to a plant, and subjected to a series of classification and thickening operations. From the classification step there is segregated a −200 mesh fraction which roughly will constitute between about 25% and about 35% of the original mined material. This −200 mesh fraction is subjected to thickening and filtering operations to reduce the moisture content. The solids are dried at a temperature of about 100° C. and are then ready for treatment in accordance with this process. If the mining method is a so-called dry mining method, the mined material is conveyed to a plant on belts and passed through a drying unit such as a rotary kiln where the solids emerge at about 100° C. The dry material is then subjected to classification operations such as an air classification operation to recover the −200 mesh fraction corresponding to that recovered in the wet classification system. In the wet classification system, the screened out +14 mesh size material is comminuted for liberation of constituents and the comminuted material subjected to sizing. The −200 mesh fraction is the preferable starting material for the subsequent processing of the instant invention.

The process of the instant invention comprises admixing leached zone solids with alkali metal reactants, either prior to or during a calcination operation, in the presence of or in the absence of carbon. This calcination produces a product of higher citrate solubility or availability than calcination operations in the absence of additives. If recovery of individual constituents is desired, the calcined admixture after slurrying in water, is digested with dilute sulfuric acid solution. The process then comprises removal of insoluble material from the aqueous solution of water soluble reaction products, precipitating alum from the aqueous solution, removing precipitated alum from the mother liquor, removing uranium and other minor values from the mother liquor and recovering the phosphorus values from the resulting aqueous solution.

More in detail the leached zone material is mixed with, for example, sodium carbonate in proportion of leached zone material to alkali metal carbonate between about 20:1 and about 1.5:1 by weight, preferably between about 10:1 and about 6:1 by weight. Useful alkali metal reactants are sodium carbonate, sodium bicarbonate, potassium carbonate and the like.

This mixture is calcined in the temperature range of between about 600° F. and about 2000° F., the temperature level being determined primarily by the degree of recovery sought as regards the minerals aluminum, phosphorus and uranium, relatively or individually. If high availability as a fertilizer is desired, then heat treatment in the range of about 1500° F. to about 2000° F. is preferable. Also, if high recovery of phosphate after a leaching operation is sought and the recovery of aluminum, for example, is incidental, the heat treatment again is preferably in the range of 1200° F. to about 2000° F. When recovery of phosphate is to be sacrificed in favor of recovery of minerals such as aluminum, uranium and the like, then heat treatment in the range of between about 700° F., and about 1200° F. is preferred. This calcination or heat treatment may be carried out in kilns, hearth furnaces and the like. Heat treatment has a marked effect upon filtration rate which has heretofore been one of the prime deterrents to chemical treatment of leached zone material.

Calcination at temperature for a period of from about one-fourth to about four hours is required to obtain good dissolution of various components in aqueous sulfuric acid leached solution with an economic digestion period. Preferably, the leached zone material is calcined for a period of about one hour.

Calcined admixture is cooled to a temperature below about 300° F. before leaching with aqueous sulfuric acid solution. This may be accomplished by blowing cold air through the material to speed its cooling, quenching in sufficient water to lower the temperature to about 300° F., or simply by storing the calcined product until heat has been dissipated and the admixture is needed for processing.

Calcined admixture is digested with an aqueous solution of dilute sulfuric acid. The calcined material is either slurried into a sulfuric acid solution of proper strength or slurried with water after which sulfuric acid is added to the solids slurry. The acid dilution to some extent is dependent upon the physical characteristics of the resulting slurry, i.e., since it is preferred to stir or otherwise agitate the reaction mix, the slurry should be sufficiently dilute to permit fluidity and the wetting of the solid particles. In general, the amount of sulfuric acid added is correlated to a large extent to the other reaction conditions of temperature, time of digestion, etc. Depending upon the analyses of the particular leached zone processed, between about 5% and about 30% acidulation is desired.

The percent acidulation referred to is that amount of acid required for stoichiometric conversion of cations to metal sulfates. 100% acidulation is that amount of acid required to convert calcium, aluminum, iron, magnesium, sodium and minor cations to the sulfate salts.

The time of digestion required normally will range between about 0.5 hours and about 6 hours, preferably between about 1 hour and about 2 hours. Such digestion times are for operating conditions of atmospheric pressure. Pressures above and below the atmospheric range will vary the reaction time. In general, the higher the pressure employed and the higher the temperature employed, the shorter the contact time required for digestion and dissolution of mineral values. The temperature of digestion at atmospheric pressure conditions generally ranges from about 150° F. to about 210° F. For a digestion time of about 60 minutes, a temperature in the range of about 165° F. to about 185° F. is generally preferred.

The digested material after treatment with sulfuric acid is filtered to remove the insoluble solids. At this stage of the processing, the slurry to be filtered generally has a specific gravity in the range of about 1.10 to about 1.35 with about 1.2 to about 1.3 preferred. Filter rates generally vary directly with the heat treatment temperatures, i.e., the higher the calcination temperature, the higher the filtration rate, although it is not implied that this is a linear function. Filtration rates also will vary with the material being processed. Admixture calcined at a temperature of about 1400° F. will have a filtration rate of about 10 to about 60 gallons of slurry per hour per square foot of filter area. This is comparable to a filter rate of about 1 to about 6 gallons of liquor per hour per square foot of filter area, when the leached zone material is not calcined and when using a disc filter. Filtration is carried out at temperatures as high as practical from an operational point of view. Generally, temperature of slurry is maintained at between about 130° F. and about 200° F. Clear liquor or extract recovered by filtration is admixed with a sulfate of ammonia such as ammonium sulfate or ammonium bisulfate or mixtures of both and cooled to about atmospheric temperature of between about 20° C. and about 30° C. This reaction results in the crystallization of a large proportion of the aluminum present in solution as ammonium alum. In general, a more complete alum removal more cheaply is obtained by increasing the concentration of ammonium sulfate rather than by resorting to lower temperatures. Generally, addition of ammonium sulfate is made to attain a $NH_4/Al_2(SO_4)_3$ mole ratio in the range between about 1.0:1 and about 4.5:1. Ammonium alum crystals are removed from the mother liquor by standard solids-liquid separation procedures. Under some conditions recovery of ammonium aluminum sulfate would not be economic. The decision to recover ammonium aluminum sulfate depends upon the composition of the mineral processed, heat treatment given the mineral and reagent conditions used in the dissolution of desired components.

Liquor free of suspended solids is subjected to uranium recovery by use of solvent extraction as the preferred modification. In solvent extraction the solution is preferably first subjected to a reduction reaction. This may be accomplished by electrolytic means or by chemical reaction with certain free metals such as iron or other agents capable of reducing the solution potential but not substantially introducing metallic ions detrimental to specification of final products. This reduction reaction is believed to partially, if not completely, reduce the uranium from a hexavalent state to a quadrivalent state. If the addition agent is in solid form, the slurry after several minutes is subjected to a liquid-solids separation to remove the unreacted material therefrom. This may be accomplished through the use of a filter, centrifuge, cyclone or other suitable separation device. Preferably iron in the form of filings is used as the reducing agent. Aluminum may be used and in this connection, aluminum could be added prior to alum crystallization so that undissolved aluminum could be recovered directly in the alum circuit. Solvent extraction of the uranium may be employed before or after alum removal in an unreduced or only partially reduced state. The major difference between the reduced and unreduced solution is that the former required fewer extraction stages.

This extraction or solvent phase is made up of two components, the extractant and the vehicle or extender. The extractant may be one or more of the ortho and/or pyro phosphoric acid esters of the alkyl monohydric alcohols. Phosphoric acid esters of octyl or higher molecular weight alcohols are preferred since they are less water soluble. The extender or vehicle may be any one or more of the common organic solvents, such as benzene, kerosene, mineral spirits, toluene, xylene, carbon tetrachloride and the like. Concentration of extractant in the extender may vary widely. For example, between about 1 and about 95%, preferably between about 5 and about 10%. The volume ratios of aqueous phase to organic phase may vary within wide limits, for example, between about 1:1 and about 40:1, preferably between about 3:1 and about 10:1. It is preferred that the contact of the organic phase with aqueous phase be in such apparatus as a mixer extraction column and at a temperature of between about room temperature of 20° C. and about 60° C.

After contact, the organic phase is separated from the aqueous solution and is treated with aqueous hydrofluoric acid or other mixture capable of precipitating and/or removing the uranium from the organic phase as a fluoride in about 5 molar excess over that required to produce uranium tetrafluoride. This precipitate, together with its accompanying aqueous phase is separated from the organic phase and the solid uranium tetrafluoride precipitate recovered by filtering, centrifuging or the like.

The aqueous solution with or without prior alum crystallization and after extraction of the uranium with organic solvent is treated to recover phosphorus, nitrogen, sulfur and other values which are present in solution. This aqueous solution may be adjusted in pH or crystallized with oxygen containing basic alkaline earth metal compounds or with such reactants as ammonium hydroxide or ammonia gas or others which form substantially water soluble solvents to give a precipitation of insoluble values such as aluminum and iron phosphate. If the pH of the solution is adjusted above neutral, best separation conditions are obtained if the original solution is neutralized to a pH above about 8 and preferably to about 10. At this stage, the slurry filters or centrifuges with greater ease. Upon removal of the metal phosphate precipitates, the liquor resulting depending upon the $P_2O_5$ and ammonia concentration, may be processed to recover ammonium phosphate values.

The invention will be further illustrated by the following example.

EXAMPLE I

Leached zone material transported from the mine site in slurry form was subjected to classification in hydro separators to recover an overflow product of −200 mesh standard screen size material in the form of about a 5% by weight aqueous slurry. This slurry was subjected to a thickening operation to increase the solids concentration to 25%, then filtered and dried to give a feed material having the following assay:

| | Percent |
|---|---|
| $P_2O_5$ | 27.7 |
| $Al_2O_3$ | 26.3 |
| $Fe_2O_3$ | 3.2 |
| F | 1.7 |
| $U_3O_8$ | 0.05 |

The dried product was divided into nine portions identified as A, B, C, D, E, F, G, H, and I, respectively.

Portion A without any additives was calcined in a muffle furnace at approximately 705° F. Portion B was mixed with sodium carbonate in the weight ratio of 25 parts leached zone to 12 parts and introduced into the same muffle furnace for heat treatment. Portion C was mixed with sodium carbonate and carbon in the weight ratio of 25:12:2, respectively, and introduced into the same muffle furnace.

The heat treatment time was for approximately one hour. After calcining portions A, B and C were air cooled to room temperature and divided into portions A1, A2, B1, B2, C1 and C2, respectively.

Portions A1, B1 and C1 were tested according to the procedure specified by the American Association of Official Agricultural Chemists for determining citrate solubility of the calcined product.

Portions A2, B2 and C2 individually were mixed with water to produce slurries of approximately 25% solids by weight. To each slurry was added 18 parts by weight of 98% sulfuric acid per 100 parts of $P_2O_5$ in the heat treated material. The acidulated slurries were digested for about three hours at a temperature of approximately 165° F. After digestion the insoluble material was filtered from the solution of water soluble reaction products. Results are shown in the attached table.

Portions D, E and F were treated in a manner corresponding to that for portions A, B and C, respectively, except that the calcining temperature was approximately 1400° F. Results are shown in the attached table.

Portions G, H and I were treated in a manner corresponding to that for portions A, B and C, respectively, except that the calcining temperature was approximately 1922° F.

From this data it is apparent that leached zone material calcined at temperatures above 700° C. in the presence of sodium carbonate has a phosphate content of markedly superior availability over that of material calcined in the absence of alkaline earth metal carbonate additive. It is also apparent that the water soluble $P_2O_5$ as measured by dissolution upon acid digestion is markedly superior for the leached zone material calcined in the presence of sodium carbonate. Addition of sodium carbonate and carbon further increases the quantity of $P_2O_5$ which can be extracted with the same quantity of sulfuric acid although little increase in citrate solubility is apparent.

Table

| Portion | Mixture Ratio by Weight | | | Calcining Temp., °F. | Citrate Soluble, Percent | Percent Recovered in Water | |
|---|---|---|---|---|---|---|---|
| | Leached Zone | Sodium Carbonate | Carbon | | | $P_2O_5$ | $U_3O_8$ |
| A | 25 | 12 | 2 | 705 | 57.2 | -------- | 29 |
| B | 25 | 12 | 0 | 705 | 61.4 | 81 | 27 |
| C | 25 | 0 | 0 | 705 | 58.0 | 9.4 | 30 |
| D | 25 | 12 | 2 | 1,400 | 77.6 | 65 | 46 |
| E | 25 | 12 | 0 | 1,400 | 77.4 | 25 | 51 |
| F | 25 | 0 | 0 | 1,400 | 47.7 | 32 | 26 |
| G | 25 | 12 | 2 | 1,922 | 94.9 | 76 | 21 |
| H | 25 | 12 | 0 | 1,922 | 94.8 | 52 | 24 |
| I | 25 | 0 | 0 | 1,922 | 17.2 | 46 | 27 |

Having thus described my invention, what I claim is:

1. The process of recovering mineral values from leached zone material which comprises admixing the material with alkali metal carbonate, calcining the admixture at a temperature in the range between about 600° F. and about 2000° F., digesting the calcined admixture with dilute sulfuric acid, separating insoluble material from the solution of water soluble reaction products and recovering at least one of the values selected from the group consisting of aluminum, phosphorus and uranium values from said solution.

2. The process of recovering mineral values from leached zone material which comprises admixing the leached zone material with alkali metal carbonate, calcining the admixture at a temperature in the range between about 600° F. and about 2000° F., digesting the calcined admixture with dilute sulfuric acid, said acid being added in an amount constituting between about 5% and about 30% acidulation, separating insoluble material from the solution of water soluble reaction products and recovering at least one of the values selected from the group consisting of aluminum, phosphorus and uranium values from said solution.

3. The process of recovering mineral values from leached zone material which comprises admixing the leached zone material with alkali metal carbonate, calcining the admixture at a temperature in the range between about 600° F. and about 2000° F., digesting the calcined admixture with dilute sulfuric acid at a temperature in the range between about 150° F. and about 210° F., said acid being added in an amount constituting between about 5% and about 30% acidulation, separating insoluble material from the solution of water soluble reaction products and recovering at least one of the values selected from the group consisting of aluminum, phosphorus and uranium values from said solution.

4. The process of recovering mineral values from leached zone material which comprises admixing the leached zone material with alkali metal carbonate, calcining the admixture at a temperature in the range between about 600° F. and about 2000° F., digesting the calcined admixture with dilute sulfuric acid for a period between about one-half hour and about six hours, said acid being added in an amount constituting between about 5% and about 30% acidulation, separating insoluble material from the solution of water soluble reaction products and recovering at least one of the values selected from the group consisting of aluminum, phosphorus and uranium values from said solution.

5. The process of recovering mineral values from leached zone material which comprises admixing the leached zone material with alkali metal carbonate, calcining the admixture at a temperature in the range between about 600° F. and about 2000° F., digesting the calcined admixture with dilute sulfuric acid for a period between about one hour and about two hours, said acid being added in an amount constituting between about 5% and about 30% acidulation, separating insoluble material from the solution of water soluble reaction products and recovering at least one of the values selected from the group consisting of aluminum, phosphorus and uranium values from said solution.

6. The process of recovering mineral values from leached zone material which comprises sizing the leached zone material to recover a —200 mesh standard screen size fraction, admixing the fraction with alkali metal carbonate, calcining the admixture at a temperature in the range between about 600° F. and about 2000° F., digesting the calcined admixture with dilute sulfuric acid, separating insoluble material from the solution of water soluble reaction products and recovering at least one of the values selected from the group consisting of aluminum, phosphorus and uranium values from said solution.

7. The process of recovering mineral values from leached zone material which comprises admixing the material with alkali metal carbonate, calcining the admixture at a temperature in the range between about 700° F. and about 1200° F., digesting the calcined admixture with dilute sulfuric acid, separating insoluble material from the solution of water soluble reaction products and recovering at least one of the values selected from the group consisting of aluminum, phosphorus and uranium values from said solution.

8. The process of recovering mineral values from leached zone material which comprises sizing the leached zone material to recover a —200 mesh standard screen size fraction, admixing the fraction with a quantity of alkali metal carbonate in the ratio between about 20:1 and about 1.5:1 by weight leached zone material to reactant, calcining the admixture at a temperature in the range between about 600° F. and about 2000° F., digesting the calcined admixture with dilute sulfuric acid, separating insoluble material from the solution of water soluble reaction products and recovering at least one of the values selected from the group consisting of aluminum, phosphorus and uranium values from said solution.

9. The process of recovering mineral values from leached zone material which comprises admixing the material with alkali metal carbonate, calcining the admixture at a temperature in the range between about 600° F. and about 2000° F., digesting the calcined admixture with dilute sulfuric acid, separating insoluble material from the solution of water soluble reaction products, adding to the solution sulfate of ammonia, cooling the solution to crystallize ammonium alum, separating ammonium alum crystals, solvent extracting mother liquor with an alkyl ester of phosphoric acid to remove uranium values, precipitating the uranium values from an organic solvent and ammoniating the extracted aqueous solution and drying the resultant slurry.

10. The process of recovering mineral values from leached zone material which comprises admixing the leached zone material with sodium carbonate, calcining the admixture at a temperature in the range between about 600° F. and about 2000° F., digesting the calcined admixture with dilute sulfuric acid, said acid being added in an amount constituting between about 5% and about 30% acidulation, separating insoluble material from the solution of water soluble reaction products and recovering at least one of the values selected from the group consisting of aluminum, phosphorus and uranium values from said solution.

11. The process of recovering mineral values from leached zone material which comprises admixing the material with alkali metal carbonate, calcining the admixture at a temperature in the range between about 600° F. and about 2000° F., digesting the calcined admixture with dilute sulfuric acid, separating insoluble material from the solution of water soluble reaction products, adding to the solution sulfate of ammonia, cooling the solution to crystallize ammonium alum, separating the ammonium alum crystals, solvent extracting mother liquor with an alkyl ester of phosphoric acid to remove uranium values, precipitating the uranium values from an organic solvent, adjusting the pH of the extracted aqueous solution to precipitate iron and aluminum phosphates, separating the precipitated phosphates, then further ammoniating the resultant solution and drying the resultant slurry.

References Cited in the file of this patent

UNITED STATES PATENTS

| | | |
|---|---|---|
| 45,961 | Liebig et al. | Jan. 17, 1865 |
| 1,880,491 | Rothe et al. | Oct. 4, 1932 |
| 2,176,609 | McCormack | Oct. 17, 1939 |
| 2,220,790 | McCullough | Nov. 5, 1940 |
| 2,643,948 | Sourdet | June 30, 1953 |
| 2,767,045 | McCullough | Oct. 16, 1956 |
| 2,769,686 | McCullough et al. | Nov. 6, 1956 |
| 2,819,145 | McCullough et al. | Jan. 7, 1958 |

OTHER REFERENCES

RMO-2042, AEC publication, Feb. 28, 1955.